(12) United States Patent
Poumarede et al.

(10) Patent No.: US 10,450,962 B2
(45) Date of Patent: Oct. 22, 2019

(54) METHOD AND A SYSTEM FOR RELIABLY STARTING A TURBINE ENGINE

(71) Applicant: SAFRAN HELICOPTER ENGINES, Bordes (FR)

(72) Inventors: Vincent Poumarede, Tarbes (FR); Pierre Harriet, Billere (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 404 days.

(21) Appl. No.: 15/104,339

(22) PCT Filed: Dec. 15, 2014

(86) PCT No.: PCT/FR2014/053334
§ 371 (c)(1),
(2) Date: Jun. 14, 2016

(87) PCT Pub. No.: WO2015/097361
PCT Pub. Date: Jul. 2, 2015

(65) Prior Publication Data
US 2017/0002744 A1    Jan. 5, 2017

(30) Foreign Application Priority Data
Dec. 23, 2013   (FR) ..................................... 13 63458

(51) Int. Cl.
*F02C 7/26*       (2006.01)
*F01D 19/00*      (2006.01)
(Continued)

(52) U.S. Cl.
CPC .............. *F02C 7/268* (2013.01); *F01D 19/00* (2013.01); *F02C 7/26* (2013.01); *F02C 7/275* (2013.01);
(Continued)

(58) Field of Classification Search
CPC ........... F02C 7/26; F02C 7/268; F02C 7/275;j H02M 3/155–158; H02M 3/1582;
(Continued)

(56) References Cited

U.S. PATENT DOCUMENTS

| 2,938,338 A | 5/1960 | Creswick et al. |
| 3,600,887 A | 8/1971 | Gault et al. |

(Continued)

FOREIGN PATENT DOCUMENTS

| EP | 2 264 297 A1 | 12/2010 |
| FR | 2 964 515 A1 | 3/2012 |
| GB | 740 090 A | 11/1955 |

OTHER PUBLICATIONS

International Search Report dated Apr. 9, 2015 in PCT/FR2014/053334 filed on Dec. 15, 2014.

*Primary Examiner* — Alain Chau
(74) *Attorney, Agent, or Firm* — Oblon, McClelland, Maier & Neustadt, L.L.P.

(57) ABSTRACT

There is provided a starting system for reliably starting a turbine engine, the system including first and second circuits connected in parallel and arranged between a battery of the engine and a DC starter of the engine, the first circuit including a DC-DC converter connected in series with a first switch and the second circuit including a second switch; a sensor configured to sense a speed of rotation of a compressor of the engine; a sensor configured to sense a temperature at an inlet to a free turbine of the engine; and a control circuit configured to control the first and second switches as a function of information supplied by the sensor configured to sense the speed of rotation of the compressor and by the sensor configured to sense the inlet temperature of the free turbine.

16 Claims, 4 Drawing Sheets

(51) Int. Cl.
  *F02C 7/268* (2006.01)
  *F02C 7/275* (2006.01)
  *F02N 11/08* (2006.01)
  *H02K 11/21* (2016.01)
  *H02K 11/25* (2016.01)
  *H02K 23/00* (2006.01)
  *H02K 7/116* (2006.01)

(52) U.S. Cl.
  CPC .............. *F02N 11/08* (2013.01); *H02K 7/116* (2013.01); *H02K 11/21* (2016.01); *H02K 11/25* (2016.01); *H02K 23/00* (2013.01); *F02N 2011/0888* (2013.01); *F05D 2220/323* (2013.01); *F05D 2260/85* (2013.01); *F05D 2270/303* (2013.01); *F05D 2270/304* (2013.01); *Y02T 50/671* (2013.01)

(58) Field of Classification Search
  CPC .............. F05D 2260/85; F05D 2220/50; F05D 2220/323; F05D 2270/02; F05D 2270/303; F05D 2270/304; H02K 11/21; H02K 11/25; H02K 7/116; H02K 23/00; H02J 3/32; H02J 7/34; H02J 9/08; F02N 11/08; F02N 11/0848; F02N 11/0862; F02N 11/0859; F02N 11/04; F02N 11/00; F01D 19/00; F01D 19/02; Y02T 50/671
  See application file for complete search history.

(56) References Cited

U.S. PATENT DOCUMENTS

| | | | |
|---|---|---|---|
| 6,093,975 A * | 7/2000 | Peticolas | F02C 9/56 290/40 A |
| 6,147,414 A | 11/2000 | McConnell et al. | |
| 6,703,719 B1 * | 3/2004 | McConnell | F01D 15/10 290/52 |
| 7,952,220 B2 * | 5/2011 | Rozman | H02J 4/00 307/9.1 |
| 8,030,788 B2 * | 10/2011 | Xu | F01D 15/10 290/31 |
| 9,221,354 B2 * | 12/2015 | Hatanaka | B60L 7/14 |
| 9,745,943 B2 * | 8/2017 | Vieillard | B64D 27/24 |
| 9,810,155 B2 * | 11/2017 | Huang | F02C 7/268 |
| 2002/0001211 A1 * | 1/2002 | Huggett | H02M 1/15 363/124 |
| 2004/0160061 A1 * | 8/2004 | Rouse | F02C 3/22 290/52 |
| 2005/0056021 A1 * | 3/2005 | Belokon | F02C 3/113 60/772 |
| 2005/0279102 A1 * | 12/2005 | O'Connor | F02C 7/275 60/778 |
| 2006/0061336 A1 | 3/2006 | Anghel et al. | |
| 2006/0066112 A1 * | 3/2006 | Geis | F01D 15/08 290/52 |
| 2010/0319357 A1 * | 12/2010 | Gazzino | F02C 7/26 60/778 |
| 2013/0229053 A1 * | 9/2013 | Rambaud | B60L 7/20 307/9.1 |
| 2015/0084345 A1 * | 3/2015 | Klinkig | B60R 16/03 290/38 E |
| 2015/0130186 A1 * | 5/2015 | Vieillard | B64D 27/24 290/31 |
| 2015/0202978 A1 * | 7/2015 | Hatanaka | B60L 7/14 701/19 |
| 2016/0208709 A1 * | 7/2016 | Huang | F02C 7/268 |

\* cited by examiner

METHOD AND A SYSTEM FOR RELIABLY STARTING A TURBINE ENGINE

TECHNICAL FIELD AND STATE OF THE PRIOR ART

The invention relates to a method and to a system for reliably starting a turbine engine.

The field of application of the invention is more particularly that of controlling the starting of gas turbine aeroengines such as turboshaft engines for helicopters or turboprops for fixed wing aircraft, or indeed the starting of gas turbine auxiliary power units (APUs) mounted on board aircraft.

Nevertheless, the invention is applicable to other types of turbine engine, e.g. industrial turbines.

In known manner, an aircraft turbine engine comprises a combustion chamber, a compressor shaft having a compressor wheel mounted thereon to feed compressed air to said combustion chamber, and at least one starter or starter-generator connected to said shaft so as to deliver sufficient starting torque thereto for driving it in rotation.

In order to start the turbine engine, the starter begins by accelerating the compressor shaft in a first starting stage during which the fuel circuit upstream from the starting injectors is put under pressure and purged. Thereafter, in a second starting stage, fuel injection is initiated prior to igniting said fuel in the combustion chamber of the engine. Finally, during a third starting stage, at some predefined speed of rotation, the action of the starter is stopped and the engine can continue to accelerate as a result of the combustion of said fuel.

In order to enable the fuel to ignite, the air supplied by the compressor wheel to the combustion chamber must comply with certain pressure and speed conditions at the fuel injectors so as to guarantee an accurate fuel/air ratio and so as to avoid blowing out the flame. However, since the volume of air supplied by the compressor wheel to the combustion chamber is proportional to the speed of rotation of the compressor shaft, the speed of rotation of the gas generator shaft must therefore lie within a range of speeds, referred to as the "ignition window", and must remain in that window for a length of time that is sufficient to ensure that ignition occurs correctly.

Conventionally, the turboshaft engines of nearly all light or medium helicopters, and even those of certain heavy helicopters, and also numerous turboprops of light fixed wing airplanes, are started using a direct current (DC) starter or a starter-generator that is powered with DC at 28 volts (V).

The main advantages of DC starters lie in the fact that they are robust electrical machines of design that is relatively simple and well understood, they are available off the shelf, and they can be used for starting a turboshaft engine directly from a 28 V power supply, e.g. the battery of the helicopter, without requiring a static converter, and without requiring any complex control strategy.

Nevertheless, practical implementation encounters difficulties that are explained with reference to FIG. 7 together with the following basic equations summarized below for better understanding.

Various parameters may be defined as follows:
Uo: the open circuit voltage of the battery 10;
Rbat: the internal resistance 11 of the battery 10;
Rcab: the resistance of the cabling 31;
Rarm: the resistance 21 of the armature winding of the starter 20;
E=E(N): the back electromotive force (back emf) of the starter 20;
Istart: armature starting current;
Ubat: voltage across the terminals of the battery 10; and
Ustart: voltage across the terminals of the starter 20.

This gives:

$$I\text{start}=(U\text{bat}-U\text{start})/R\text{cab}=(Uo-E(N))/(R\text{ab}+R\text{cab}+R\text{arm})$$

With: $E(N)=k \times N$, N being the speed of rotation of the starter 20 and $\underline{k}$ being an electrical constant of the starter 20 (which depends in particular on its winding).

Furthermore, the electromagnetic torque of the starter 20 is expressed by:

$$Cem=k \times I\text{start} \times Iex$$

where Iex is the excitation current (Iex=Istart for a starter with series excitation, it also being possible for Iex to be regulated independently by a generator control unit (GCU) for separately excited machines).

It can be deduced that, at N=0, E=0, and thus:

$$I\text{start}=Uo/(R\text{bat}+R\text{cab}+R\text{arm})$$

It can be seen that the armature current Istart during the first instants of starting, i.e. when the back emf of the starter 20 is still very low, is directly proportional to the open circuit voltage Uo of the battery 10 and is limited solely by the total resistance (Rbat+Rcab+Rarm) of the power line. Unfortunately, the power supply voltage (e.g. having a design value of 28 V under nominal conditions) can vary considerably, depending on whether starting is being done from the battery or form a ground power unit. Furthermore, the internal resistance of the battery Rbat increases at low temperature. However, the resistances of the electrical conductors Rcab and Rarm increase when temperature rises.

It can thus be understood that the current, and consequently the torque, at the beginning of starting can vary considerably as a function of the type of power supply that is providing, say, 28 V (battery, starter-generator of the other turbine, APU of the aircraft, or ground power unit used for starting on the ground), on ambient conditions (temperature), and on circumstances (starter hot or cold).

In practice, the manufacturer limits the starting current by using a cable of appropriate section (providing some minimum value of resistance), or by connecting in series a starting resistance that is shunted after a few instants, as explained below.

Furthermore, the torque opposed by the gas generator and the associated transmission gearbox is also highly variable, in particular as a function of parameters relating to atmospheric pressure and temperature P0, T0 (associated with the density of the air), and to oil temperature (associated with friction in the transmission gearbox which essentially comprises stepdown gearing with accessory equipment being mounted thereon such as pumps, an alternator, a starter, etc. . . . ).

The specified minimum starting torque increases with decreasing temperature, as can be seen in FIG. 8 which plots curves 1 to 4 showing how torque varies as a function of speed of rotation expressed as a percentage of the nominal value NG for the speed of rotation of the gas generator, respectively for a maximum torque Cmax, a minimum torque Cmin1 at −40° C., a minimum torque Cmin2 at −30° C., and a minimum torque Cmin3 at +55° C.

This often leads the manufacturer to overdimension the starting power circuit in order to minimize the impedance of the cabling Rcab and in order to supply sufficient torque at very low temperature, when on the ground and when using batteries. Consequently, when starting using a ground power unit (rarely standardized, often delivering a voltage that is high), at altitude (with the compressor presenting low opposing torque), or with an engine that is already hot (possessing low friction), it is possible to have a starting torque that is very high—greater than the specified maximum value Cmax—and an opposing torque that is low, leading to the gas generator to accelerate fast so that it passes too quickly through the ignition window.

It is also known that certain turbine engines are characterized by an ignition window that is low and relatively narrow, lying in the range approximately 8% NG to 15% NG, where NG is the nominal speed of the gas generator, with 100% NG corresponding approximately to the speed of rotation of the compressor shaft when the engine is operating under conditions enabling it to deliver its maximum takeoff power (TOP): outside those limits, the chamber cannot ignite.

Furthermore, the sparking frequency of the ignition spark plugs in the combustion chamber is generally very low, of the order of a few hertz (Hz): the number of sparks and thus the probability of ignition become even smaller if the gas generator remains in the ignition window for little time.

Another factor that is difficult to take into account is the variable time required for filling fuel into the injection harness associated with the combustion chamber, and this can lead to a delay between the instant at which the valves are opened and the instant at which fuel actually penetrates into the chamber.

Finally, once the starting injectors have ignited, the time required for the flame to propagate to the adjacent injectors is also a phenomenon that is complex and poorly controlled at present, thereby requiring air to flow at a speed that is not too great.

For all these reasons, it is therefore important to avoid passing too quickly through the ignition window, and to remain therein for some minimum duration in order to be certain of igniting the chamber under good conditions and in order to be certain of stabilizing the flame.

It can thus be seen that a poorly controlled starting torque that might be too high can lead to passing through the ignition window too quickly and to failure to start.

It has been observed that present-day 28 V starter-generators and starters that are not controlled find it difficult to comply with the contradictory specifications for minimum torque and maximum torque in all possible situations.

It is therefore desirable to have a system that enables ignition and starting of turboshaft engines to be made more robust.

As shown in FIG. 9, proposals have already been made to incorporate a starting resistance: in order to limit the starting current, a resistor 32 of resistance Rstart that is connected in series with a switch 33 is put into series with the battery 10 (thereby creating a voltage drop that thus makes it possible to limit the current while the back emf of the starter 20 is low). The resistance 32 is short-circuited above a certain speed threshold by closing a switch 34. Nevertheless, the starting resistance serves to reduce acceleration of the gas generator only under circumstances in which the starter torque is too high (high battery voltage, low resistances, hot engine, etc. . . . ).

Under other circumstances, in particular when the opposing torque is high or the power supply voltage is low (cold battery), there is no need to limit starting current, and indeed that might potentially be a handicap.

Furthermore, the starting resistance dissipates a very large amount of power (1 kilowatt (kW) to 3 kW); it is therefore complex to fabricate and it needs to be installed in a location where Joule effect heat losses can easily be discharged without excessively heating the surrounding equipment. Finally, the energy lost in the resistance leads to overdimensioning the battery.

Proposals have also been made to perform series/parallel starting as shown in FIGS. 10 and 11. That solution is used on certain turboprops that are started with 28 V batteries. It requires two batteries 13 and 14. At the beginning of starting and below a speed (or current) threshold, the batteries 13 and 14 are connected in parallel, as shown in FIG. 10, where two switches 15 and 16 are closed while a switch 17 is open. The starter 20 is thus powered at a voltage U equal to 28 V, and the batteries 13 and 14 share the high starting current, with a current I/2 flowing through each of the batteries 13 and 14.

Above a speed threshold, when the back emf of the starter 20 has increased sufficiently to limit the current, the batteries 13 and 14 are reconnected in series, as shown in FIG. 11, where the two switches 15 and 16 are open, while the switch 17 is closed. A current I thus flows through each of the batteries 13 and 14. The starter 20 is then powered at twice the voltage 2U, equal to 56 V in the present example, thereby enabling the maximum assistance speed to be increasing without defluxing the starter 20.

Series/parallel starting requires two 28 V batteries, whereas helicopters generally have only one (with the exception of "cold weather kit"), and a DC starter that is designed to operate at a nominal voltage of 56 V. Not all 28 V starter-generators and starters available off the shelf are designed to accept that voltage in repeated use. Furthermore, the problem of accelerating too fast in the ignition window is not handled, since the purpose of that circuit is rather to continue assisting the gas generator to accelerate at high speed (and thus with high back emf) without defluxing the starter.

Proposals have also been made to optimize the starting sequence (and stages) under computer control. The idea is to drive and stabilize the speed of rotation of the shaft of the gas generator in the preferred ignition window, and then once ignition is observed (e.g. by detecting an increase in T45, i.e. the temperature of the gas at the inlet to the free turbine), to control acceleration in optimum manner. The graph of FIG. 12 shows that method and shows a speed of rotation that increases as a function of time (segment 5), followed by a constant speed of rotation NGignition that may vary within a range from 8% NG to 15% NG (segment 6), where NG is the nominal speed of rotation of the gas generator, and then after detecting ignition, e.g. by detecting an increase in the temperature (T45) of the gas at the inlet to the free turbine, a speed of rotation that once more increases as a function of time (segment 7). The segment 6 thus corresponds to maintaining the speed of rotation at a value that is more or less constant within the ignition window, whereas the segment 7 corresponds to acceleration that is more or less constant.

Documents WO 2011/056360 and CA 2 685 514 also describe controlled starting relationships for turbine engines.

As shown in FIG. 13, Document US 2010/0283242 describes the electrical architecture of a device for starting a turboprop 40 using an alternating current (AC) starter 20 powered by a DC/AC control converter 23, thus enabling the acceleration of the gas generator to be controlled. The DC/AC control converter 23 is itself powered from a 28 V battery 10 via a voltage-boosting DC/DC converter 21 and a DC bus 22. Rather similar architecture, based on putting in cascade DC/DC and DC/AC converters that are designed for the full power of starting is described in patent document U.S. Pat. No. 5,493,201.

It may be observed that the above-mentioned "optimized" starting, and also the variants identified in the various above-mentioned patent documents, when applied in full, i.e. with acceleration of the gas generator being controlled after ignition, can be implemented only when using special starter technologies (e.g. a synchronous machine with an excitation winding), the starter also requiring controlling power electronics (inverter) enabling control to be provided over speed and torque with the ability to supply the starter with its maximum power, which can briefly reach levels that are quite high (in the range 10 kW to 20 kW). Such power electronics is thus particularly heavy and expensive.

Power architectures using "high voltage" AC starters require not only a specific rotary machine and a DC/AC converter that is dimensioned for the full power, but they also require a DC/DC chopper to raise the network voltage of 28 V to the voltage of the DC bus (a few hundred volts). Under all circumstances, this thus constitutes a solution that is particularly heavy, complex, and expensive.

OBJECT AND DEFINITION OF THE INVENTION

The invention seeks to remedy the above-mentioned drawbacks and in particular to make it possible to avoid overdimensioning the electrical power supply batteries, while improving the reliability of starting and making ignition and starting of turboshaft engines more robust.

To solve the above-mentioned problems, the invention provides a starting system for reliably starting a turbine engine, the system comprising a storage battery, a DC starter, an electronic regulation computer, a transmission gearbox (serving in particular to enable the starter to drive the gas generator and the fuel pumps mechanically), starting accessories (such as spark plugs, and starting and/or stopping solenoid valves) for managing the distribution of fuel to injectors and for igniting the fuel during a starting stage, a gas generator itself comprising a compressor, a combustion chamber, and a high pressure turbine, together with a free turbine (e.g. for the purpose of driving a helicopter rotor or a turboprop propeller via mechanical gearing), the system being characterized in that it further comprises first and second circuits connected in parallel and arranged between said storage battery and said DC starter, in that the first circuit comprises a DC-DC converter connected in series with a first switch and the second circuit comprises a second switch, and in that it further comprises at least a sensor for sensing the speed of rotation of the compressor, a sensor for sensing the temperature at the inlet to the free turbine, and a control circuit for controlling said first and second switches as a function of information supplied by said sensor for sensing the speed of rotation of the compressor and by said sensor for sensing the inlet temperature of the free turbine.

Preferably, the system further includes a diode connected in the first circuit in series with the DC-DC converter and the first switch.

In a particular embodiment, the DC starter is of the starter-generator type, thus making it possible, above a speed threshold of the gas generator, to switch the starter-generator into generator mode, e.g. so as to power an on-board network of an aircraft in which the turbine engine is installed.

In a particular embodiment, the starting system further comprises a sensor for sensing the speed of rotation of the DC starter and the DC-DC converter is servo-controlled by the sensor for sensing the speed of rotation of the DC starter when said first switch is closed.

Under such circumstances, the electronic regulation computer may include a unit for preparing a speed setpoint Nref corresponding to a preferred ignition window of the turbine engine and a transmission link for transmitting the speed setpoint Nref to the DC-DC converter.

In another particular embodiment, the DC-DC converter is servo-controlled by said sensor for sensing the speed of rotation of the compressor when said first switch is closed.

Under such circumstances, the electronic regulation computer may include a unit for preparing a speed setpoint Nref corresponding to a preferred ignition window of the turbine engine, a unit for preparing a torque setpoint Cref of the starter, and a transmission link for transmitting the torque setpoint Cref to the DC-DC converter.

By way of example, the DC-DC converter may include an electromagnetic compatibility filter, a pre-load circuit, and a buck type chopper.

More particularly, the electronic regulation computer includes a unit for preparing respective logic signals SL1, SL2 that are applied to a unit for managing the on-board network of a helicopter to actuate the first and second switches.

The electronic regulation computer includes a unit for detecting that the speed of rotation NG of the compressor has exceeded a predetermined threshold and for deactivating the first and second switches and also for deactivating the starting accessories.

In an aspect of the invention, the control circuit of the DC-DC converter comprises both a speed servo-control loop and a current servo-control loop.

The speed servo-control loop and the current servo-control loop may be incorporated in an independent controller circuit for controlling the DC-DC converter.

In a variant embodiment, the speed servo-control loop is incorporated in the electronic regulation computer and the current servo-control loop is incorporated in an independent controller circuit for controlling the DC-DC converter.

The invention also provides a starting method for reliably starting a turbine engine comprising a storage battery, a DC starter, an electronic regulation computer, a transmission gearbox, starting accessories for managing the distribution of fuel to injectors and for igniting the fuel during a starting stage, a gas generator itself comprising a compressor, a combustion chamber, and a high pressure turbine, together with a free turbine, the method being characterized in that it comprises the following steps:

connecting first and second circuits in parallel and interposing them between said storage battery and said DC starter, the first circuit comprising a DC-DC converter connected in series with a first switch, and the second circuit comprising a second switch;
  measuring the speed of rotation of the compressor;
  measuring the temperature at the inlet of the free turbine; and
  controlling said first and second switches as a function of measurement information concerning the speed of rotation of the compressor and the temperature at the inlet of the free turbine.

In more particular manner, when initializing starting, the starting accessories are activated and simultaneously a speed setpoint Nref is transmitted to said DC-DC converter, the speed setpoint corresponding to a preferred ignition window of the turbine, and said first switch is closed while activating the DC-DC converter to accelerate the compressor and then to regulate the voltage delivered to the starter so as to regulate the acquisition of speed by said compressor to the speed setpoint Nref, and when said speed setpoint Nref is reached, the combustion chamber of the turbine engine is ignited, the temperature at the inlet of the free turbine is measured, and once a rise in temperature is detected confirming that the combustion chamber has ignited, the second switch is closed, the first switch is opened, and the DC-DC converter is deactivated, and after detecting that the speed of rotation of the compressor has exceeded an end-of-starting threshold, the starting accessories are deactivated and the second switch is opened so as to deactivate the starter.

The invention applies most particularly to systems for starting turboshaft engines of aircraft, and in particular of helicopters.

The present invention takes account of the fact that the critical instant when starting a turbine engine is igniting the combustion chamber. Stabilizing the speed of the gas generator in the preferred ignition window for a sufficient duration, until ignition is detected, thus serves to avoid most of the causes for failing to ignite: poorly controlled starter torque, passing too quickly through the ignition window, time required to fill the fuel pipework, time required for the flame to propagate from the ignition injectors to the main injectors at very low temperature and then to stabilize, etc. . . . .

This constraint, which applies only at low speeds of rotation of the gas generator (less than 15% NG, where NG is the nominal speed of the generator), requires the manufacturer to limit starting torque over the entire range of speeds, and that can be a handicap in situations of starting at very low temperature where the opposing torque from the gas generator is high, the power supply voltage to the starter is low, and ignition is difficult.

In contrast, once the chamber is ignited, the maximum and minimum torque requirements relating to accelerating the gas generator are much less constraining: it suffices for the torque to be sufficiently high to assist the gas generator up to the speed where the power recovered from the high pressure turbine enables the gas generator of the turboshaft engine to accelerate on its own, and not so great as to blow out the flame. In this second stage, it is not essential to have accurate dNG/dt control over the starter, and this is particularly advantageous since the power being drawn is then much greater.

The invention thus consists in a device under the control of the turboshaft computer that serves to bring the gas generator of the engine up to speed and to maintain it at a constant speed in the ignition window of the engine, so long as the combustion chamber of the engine has not ignited. The main advantage is that the power needed for keeping the gas generator rotating in the ignition window is very low. By way of example, the mechanical power needed for keeping rotation of the gas generator of a helicopter turboshaft engine in its ignition window is of the order of 1 kW to 3 kW, whereas the maximum power developed by the starter during the starting sequence may be as much as 5 kW to 20 kW, i.e. 5 to 7 times greater. The unit based on low power electronics is thus of a size and a cost that are much lower than they would be for an analogous system designed to control the starter over the entire range of starting speeds.

Once ignition has been detected, the device is shunted and the starter is powered directly from the on-board network of the aircraft, typically at 28 V, without control, the back emf from the already rotating starter at the time of switchover serving to reduce the starting current and to eliminate a large portion of the current peak that is observed when the gas generator is initially stationary.

BRIEF DESCRIPTION OF THE DRAWINGS

Other characteristics and advantages of the invention appear from the following description of particular embodiments given as examples and with reference to the accompanying drawings, in which.

DETAILED DESCRIPTION OF PREFERRED EMBODIMENTS

Figure 1:
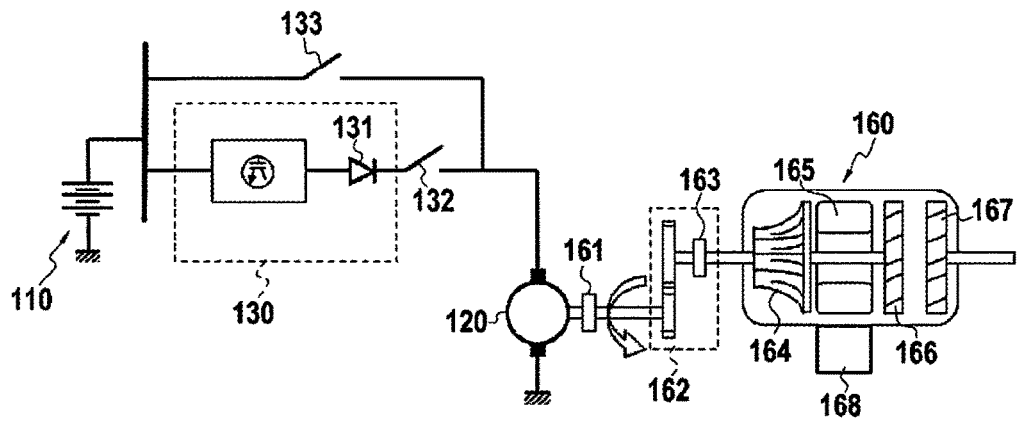
FIG. 1 is a diagrammatic overall view of an embodiment of a turbine engine starter device in accordance with the invention.

FIG. 1 is a diagram showing the general configuration of a device of the invention.

The reliable starter system for a turbine engine comprises a storage battery 110 that may be a single battery or a group of batteries and that may be constituted by the power supply from an on-board network of an aircraft, e.g. 28 V, but the invention is not limited to this voltage.

A DC starter 120 may be constituted by a simple DC starter or by a starter generator (SG) capable of operating not only in motor mode, but also in generator mode once the starting stage has terminated, e.g. in order to power an on-board network. In the description below, the term "starter" is used to cover both a starter only and/or a starter-generator, unless specified to the contrary.

The turbine engine starter system includes a transmission gearbox 162 including in particular stepdown gearing for transmitting motion from the starter 120 to the main axis of the engine, and also including auxiliary equipment, such as pumps associated with injectors for injecting fuel into the combustion chamber.

FIG. 1 also shows the main elements of the turbine engine comprising a gas generator 160, itself comprising a compressor 164, a combustion chamber 165, and a high pressure turbine 166, together with a free turbine 167, and starting accessories 168. FIG. 1 also shows a sensor 161 for sensing the speed of rotation of the starter 120 and a sensor 163 for sensing the speed of rotation of the shaft of the compressor 164 of the engine.

The starter system of the invention has first and second circuits connected in parallel and inserted between the storage battery 110 and the DC starter 120. The first circuit comprises a DC-DC converter 130 connected in series with a first switch 132 and optionally with a diode 131. The second circuit comprises a second switch 133.

As described below with references to FIGS. 3 and 5, the system also has other sensors for measuring the operation of the engine, such as a sensor 151 for sensing the temperature at the inlet to the free turbine 167. The temperature T45 at the inlet to the free turbine 167 provides information representative of ignition conditions in the combustion chamber 165. It is therefore possible, instead of the sensor 151, to make use of any other type of sensor that makes it possible to observe the ignition conditions in the combustion chamber 165.

The first and second switches 132, 133 are controlled by a control circuit 141 (FIGS. 3 and 5) as a function of information delivered by the sensor 163 for sensing the speed of rotation of the compressor 164, and by the sensor 151 for sensing the temperature at the inlet to the free turbine 167.

An electronic regulation computer 142, 142', which may be constituted by a conventional electronic computer of the engine, also known as an electronic engine controller (EECU) (FIGS. 3 and 5), serves to manage the measurements supplied by the sensors 151 and 163 and to control the DC-DC converter 130 in co-operation with the control circuit 141, which may be a pre-existing electrical master box, such as a module for managing the on-board network of an aircraft.

The starter device of the invention is thus constituted essentially by a DC-DC converter 130 that, when the contactor 132 is closed, powers the starter 120 at the beginning of the starting stage and supplies the power needed to keep the gas generator 160 in the ignition window.

Once ignition has been confirmed, the contactor 133 is closed and the contactor 132 is opened so as to power the starter 120 without interruption directly from the battery 110, which may be incorporated in the on-board network, e.g. at 28 V, so as to enable starting to be continued in non-controlled manner.

The switches 132 and 133 may form parts of the "electrical master box" of the helicopter. The diode 131 is not essential, however it can nevertheless be useful for the purpose of protecting the outlet from the DC-DC converter 130 during overlapping operation of the contactors 132 and 133.

By way of example, the DC-DC converter 130 may comprise a simple buck chopper 136 (see FIG. 2) that takes the power supply voltage U of the network (e.g. 28 V) and delivers to the starter armature 120 the current $I_D$ needed for regulating the torque of the starter 120 and thus servo-controlling the speed of rotation NG of the shaft of the compressor 164 of the gas generator 160 on the setpoint, independently of operating conditions (voltage of the on-board network, impedances of the power supply 110 and the starter 120, opposing torque from the compressor 164, etc. . . . ).

Since the electrical power needed is low, the DC-DC converter acts as a progressive starter system that limits the current drawn from the on-board network during the first instant of starting, when the back emf of the starter 120 is almost zero. This aspect makes it possible to reduce temperature constraints on the starter 120, mechanical constraints on the fluting, and the weak link of the drive from the starter 120, and, when starting on the battery 110 of the helicopter, it also makes it possible to diminish the drop in voltage observed in the on-board network when switching on the starter 120 when both speed and back emf are zero.

Regulating the speed of the electrical machine requires a speed sensor 161, which may either form part of the starter 120 itself (some starter-generators come fitted therewith, in particular in order to manage defluxing), or else may be secured to the drive of the starter 120 (phonic wheel, Hall effect sensor, etc.).

Figure 3:
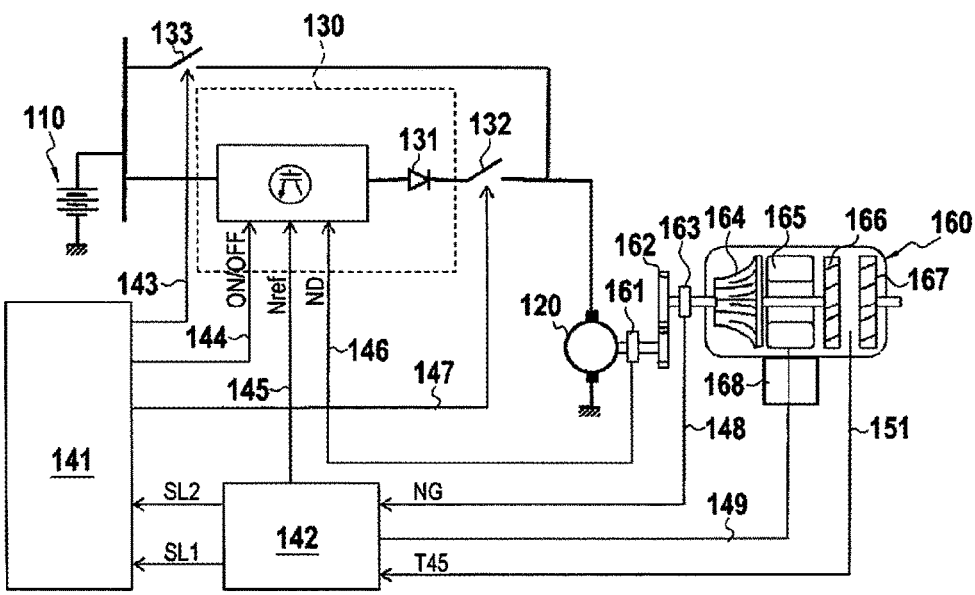
FIG. 3 is a diagrammatic overall view of a first embodiment of a turbine engine starter device in accordance with the invention, together with its control circuit.

Since the preferred ignition window can vary as a function of the flying conditions (atmospheric pressure P0, atmospheric temperature T0), it is desirable to be able to vary the speed setpoint Nref for the DC-DC converter 130, which setpoint is prepared by the computer 142 of the turboshaft engine and is transmitted to the device over a digital or analog link 145 (e.g. as a variable duty ratio), as shown in FIG. 3.

Figure 2:
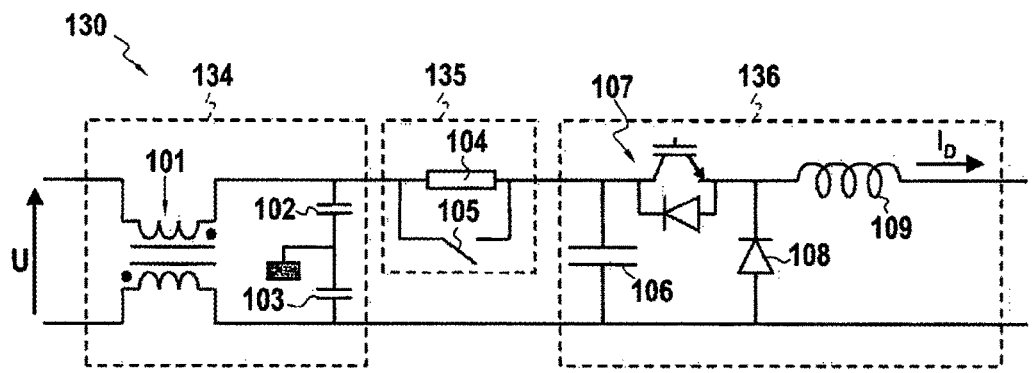
FIG. 2 is a more detailed view of an example of a DC-DC converter suitable for including in the device of the invention shown in FIG. 1.

By way of example, and as shown in FIG. 2, the DC-DC converter 130 may include an electromagnetic compatibility filter 134 with coupled iron-cored inductors 101 and capacitors 102, 103 followed by a pre-loading circuit 135, having a resistor 104 that can be shunted by a switch 105, and a buck type chopper 136, with a capacitor 106, a controlled switch 107 constituted by power semiconductor components, a diode 108, and an inductor 109 for outputting a direct current (DC) $I_D$.

There follows a more detailed description of the operation of the starter system of the invention in several variant embodiments, with reference to FIGS. 3 to 6.

Figure 5:
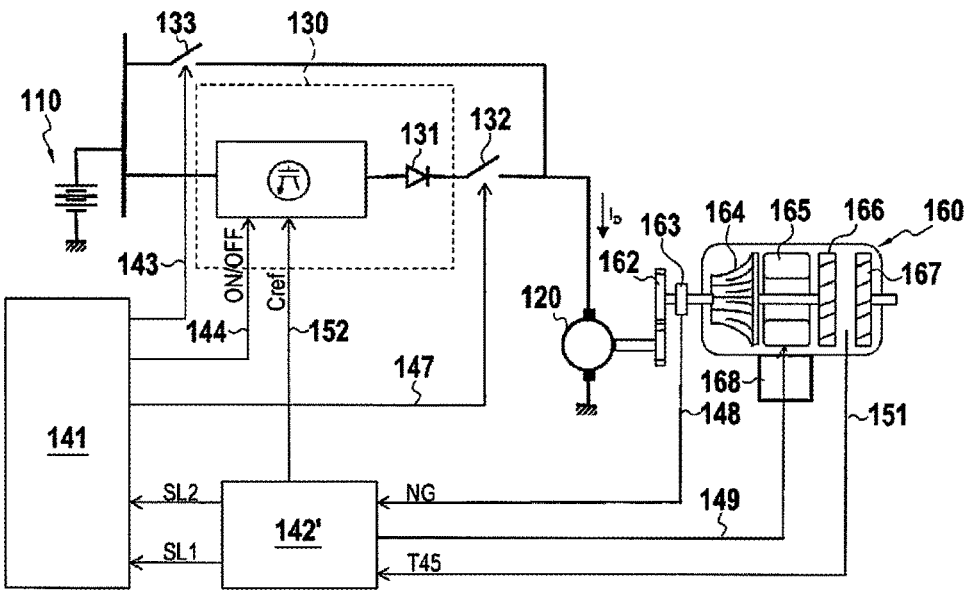
FIG. 5 is a diagrammatic overall view of a second embodiment of a turbine engine starter device in accordance with the invention, together with its control circuits.

On selecting starting, the computer (EECU) controlling the turbine engine 142 sends a logic signal SL1 to the system for managing the on-board network of the helicopter (electrical master box) 141, activates a starting solenoid valve and the spark plugs, and applies a fuel flow control relationship appropriate for starting by means of a line 149 for controlling starting accessories that are symbolically grouped together in FIGS. 1, 3, and 5 under the reference 168.

Simultaneously, the EECU 142 uses various parameters that it acquires (atmospheric pressure P0, atmospheric temperature T0, residual temperature T45, i.e. the temperature of the gas at the inlet to the free turbine, etc. . . . ), in order to prepare the speed setpoint Nref corresponding to the preferred ignition window of the turboshaft engine, and it transmits this setpoint to the DC-DC converter 130.

On activation of the logic signal SL1, the electrical master box 141 closes the contactor 132 (activation via the line 147) and sends the activation setpoint to the DC-DC converter 130 (activates the "ON/OFF" signal via the line 144).

The DC-DC converter 130 powered by the on-board network 110 begins to operate, accelerates rotation of the shaft of the compressor 164 of the gas generator 160, and then regulates the current $I_D$ delivered to the starter 120 so as to regulate the acquisition of speed NG by the rotary machine on the speed setpoint Nref.

Once the EECU 142 observes that the speed of rotation NG of the shaft of the compressor 164 of the gas generator 160, as measured by the sensor 163 and supplied to the EECU by the line 148, has reached the speed setpoint Nref and has become stabilized thereat, the electronic regulation computer 142 proceeds to ignite the turbine engine by sending the required control information over the line 149 for controlling the starting accessory.

When the EECU 142 detects and confirms ignition of the combustion chamber, e.g. by measuring the rise in T45 via the line 151, it sends a logic signal SL2 to the system 141 for managing the on-board network of the helicopter, and then deactivates the logic signal SL1.

On activation of the logic signal SL2, the electrical master box 141 closes the contactor 133 (activation via the line 143): the starter 120, powered directly from the on-board network 110, continues accelerating and starting the turbine engine in conventional manner. Simultaneously, the diode 131 becomes blocked against reverse current, thus serving to avoid short-circuiting the outlet from the DC-DC converter 130.

It should be observed that overlap in the control of the contactors 132 and 133, as made possible by the diode 131, serves to guarantee that there is no discontinuity in the electrical power supply to the starter 120.

On deactivation of the logic signal SL1, the electrical master box 141 opens the contactor 132 (deactivation of the signal transmitted via the line 147), thereby isolating the outlet from the DC-DC converter 130 of the starter 120, and sending the deactivation setpoint for the DC-DC converter 130 (deactivation of the ON/OFF signal on the line 144).

When the EECU 142 detects that the speed NG of the shaft of the compressor 164 of the gas generator 160 exceeds an end-of-starting threshold (threshold from which the turboshaft engine operates independently), it deactivates the starting accessories 168 via the line 149, and also the logic signal SL2.

On deactivation of the logic signal SL2, the electrical master box 141 opens the contactor 133 (deactivation of the control signal via the line 143), thereby switching off the electrical power supply to the starter 120.

Above a speed threshold, the starter-generator 120 can be switched into generator mode so as to power the on-board network 110, however this operation cannot be performed if the starter is a starter only.

Figure 4:
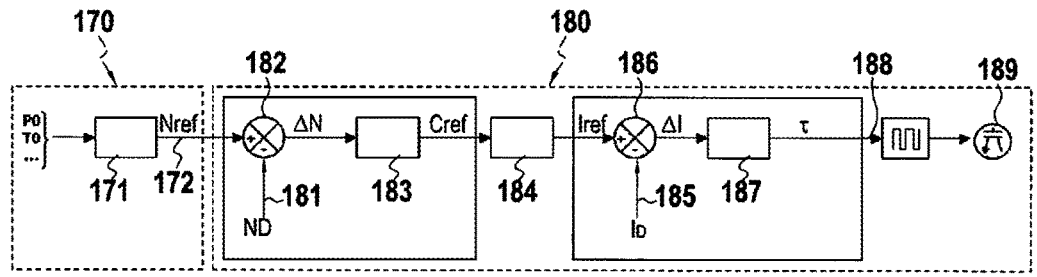
FIG. 4 is a diagrammatic view of a servo-control loop corresponding to the first embodiment of FIG. 3.
Figure 6:
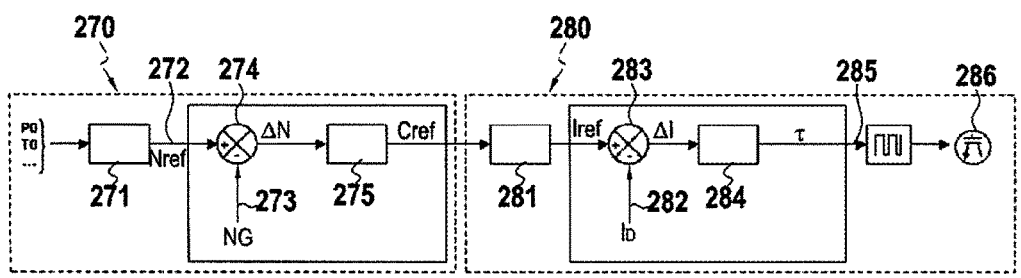
FIG. 6 is a diagrammatic view of a servo-control loop corresponding to the second embodiment of FIG. 5.
Figure 7:
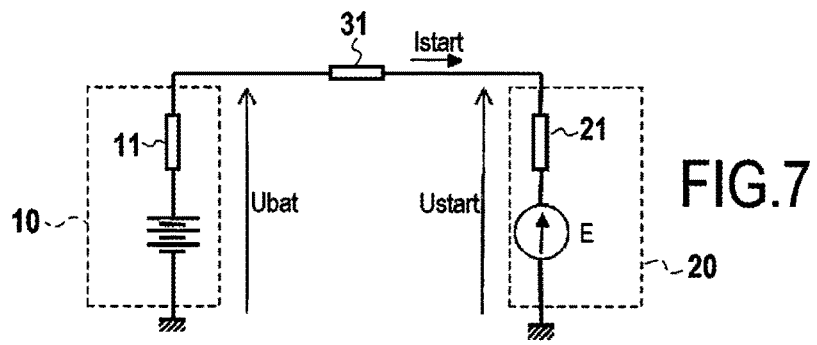
FIG. 7 is an electrical circuit diagram corresponding to a prior art starter device.
Figure 8:
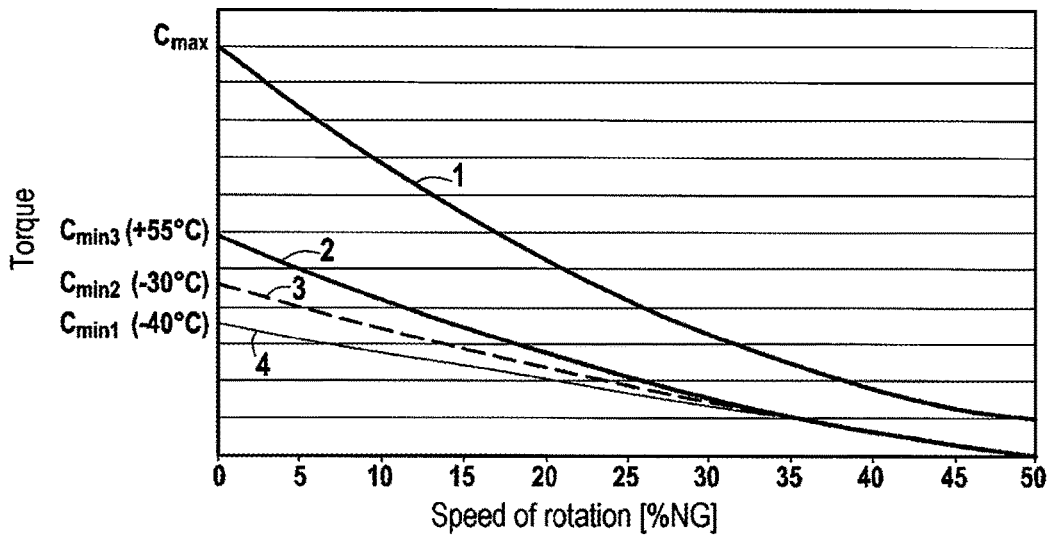
FIG. 8 is a graph plotting various curves showing the appearance of maximum and minimum values for the starter torque as a function of speed of rotation for various operating conditions, suitable for guaranteeing ignition of the combustion chamber within the flying conditions.
Figure 9:
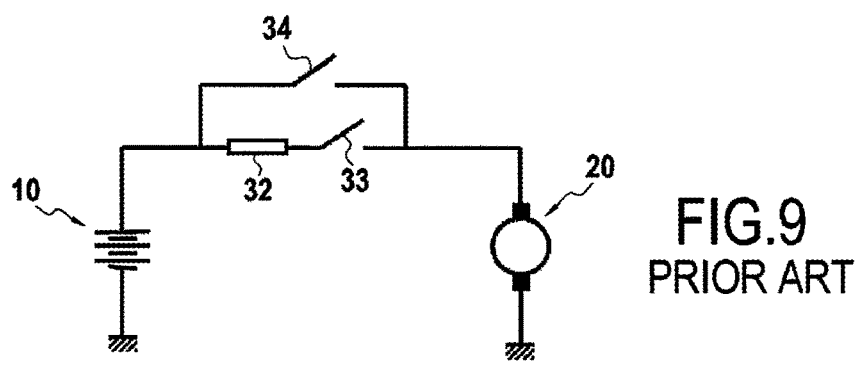
FIG. 9 is an electrical circuit diagram showing the insertion of a starter resistance in the prior art.
Figure 10:
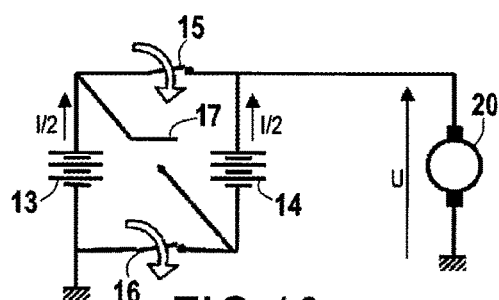
FIGS. 10 and 11 are electrical circuit diagrams of a prior art starter device having two batteries that are connected respectively in parallel and in series as a function of a threshold speed.
Figure 11:
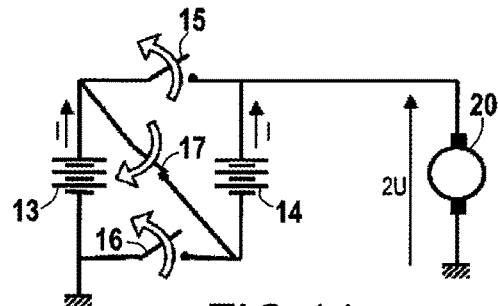
Figure 12:
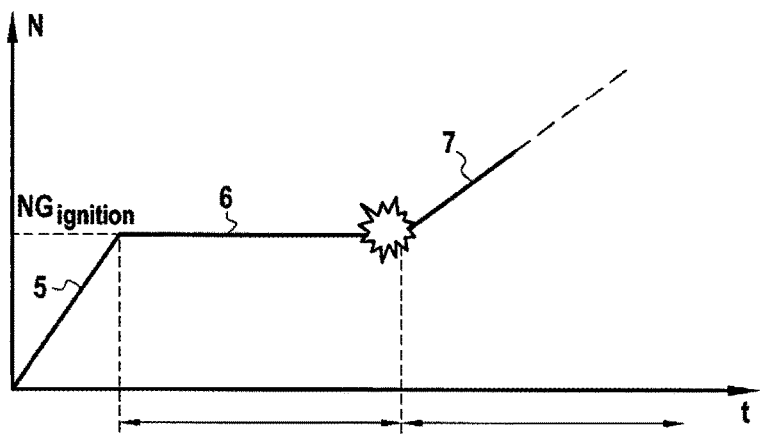
FIG. 12 is a graph showing a known starting sequence as controlled by a computer.
Figure 13:
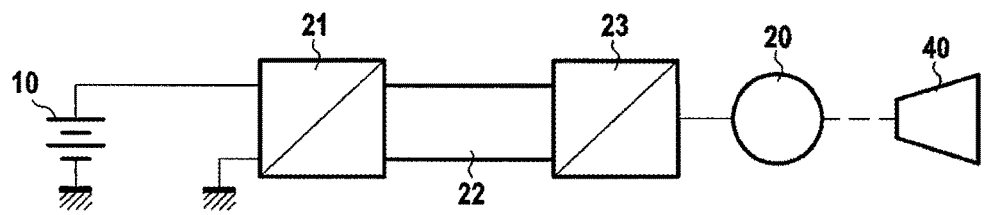
FIG. 13 is a diagram of a prior art starter device for a turboprop using an AC starter powered by a DC-AC controlled converter.

From the point of view of controlling the DC-DC converter 130, there are to be found in conventional manner two interleaved regulation loops: speed servo-control followed by torque or current servo-control (see FIGS. 4 and 6).

The speed setpoint Nref corresponding to the ideal ignition window for the turbine engine, as delivered by the line 172, is prepared by the EECU 170 of the turbine engine in the block 171 as a function of parameters that are acquired by the EECU 170 (for example and in non-exhaustive manner, atmospheric pressure P0, air temperature T0 at the inlet to the compressor, ...), and is then transmitted to the control system 180 of the DC-DC converter 130 in digital or analog manner.

The speed ND of the rotary machine as measured by the sensor 161 and as transmitted by the line 146 (FIG. 3) or 181 (FIG. 4) is compared with the speed setpoint Nref in the comparator 182 in order to give a speed error ΔN, which is processed by the corrector 183 in order to give a torque setpoint Cref. This torque setpoint Cref is processed by the block 184, which transforms it into a current setpoint Iref. The measured current $I_D$ at the outlet from the DC-DC converter 130 is compared with the reference Iref in the comparator 186 to give an error ΔI, which is processed by the corrector 187 to give a setpoint 188 for the conduction duty ratio τ, which is used for controlling the power semiconductor(s) 189 (FIG. 4) or 107 (FIG. 2) of the chopper of the DC-DC converter 130.

In another embodiment that is slightly different and shown in FIGS. 5 and 6, the speed servo-control loop is calculated by the EECU 270. The speed setpoint Nref supplied as input 272 to a comparator 274 is prepared by the EECU 270 in the same manner as above, in a block 271 that is analogous to the block 171 of FIG. 4, but it is compared with the measured speed of rotation NG of the shaft of the compressor 164 of the gas generator 160 (which is proportional to the speed of rotation ND of the starter 120), as supplied on the input 273 of the comparator 274 so as to prepare the torque setpoint Cref, which is transmitted by the EECU 270 to the control circuit 280 of the DC-DC converter 130. This torque setpoint Cref is processed by the control circuit 280 of the DC-DC converter 130 in the same manner as in the above-described embodiment of FIG. 4, the elements 281 to 286 of FIG. 6 corresponding to the elements 184 to 189 of FIG. 4 respectively and not being described again, so as to end up with controlling the semiconductors 286 of the chopper.

It can be seen that one of the advantages of this embodiment is that it makes it possible to omit the speed sensor 161 on the starter 120, the speed loop being processed directly in the turboshaft engine computer by acquiring the speed NG of the gas generator using the sensor 163.

In general manner, the invention relates both to a system and to a method for reliably starting a turbine engine.

The method for reliably starting a turbine engine having a storage battery 110, a DC starter 120, an electronic regulation computer 142, 142', a transmission gearbox 162, starting accessories 168 for managing the distribution of fuel to injectors and for igniting the fuel during a starting stage, a gas generator 160 itself comprising a compressor 164, a combustion chamber 165, and a high pressure turbine 166, together with a free turbine 167, comprises the following steps:

connecting first and second circuits in parallel and interposing them between said storage battery 110 and said DC starter 120, the first circuit comprising a DC-DC converter 130 connected in series with a first switch 132 and the second circuit comprising a second switch 133;

measuring the speed of rotation of the compressor 164;

measuring the temperature at the inlet of the free turbine 167; and controlling said first and second switches 132, 133 as a function of measurement information concerning the speed of rotation of the compressor 164 and the temperature at the inlet of the free turbine 167.

More particularly, when initializing starting, the starting accessories 168 are activated and simultaneously a speed setpoint Nref is transmitted to said DC-DC converter 130, the speed setpoint corresponding to a preferred ignition window of the turbine, and said first switch 132 is closed while activating the DC-DC converter 130 to accelerate the compressor 164 and then regulate the voltage delivered to the starter 120 so as to regulate the acquisition of speed by said compressor 164 to the speed setpoint Nref, and when said speed setpoint Nref is reached, the combustion chamber 165 of the turbine engine is ignited, the temperature at the inlet of the free turbine 167 is measured, and once a rise in temperature is detected confirming that the combustion chamber 165 has ignited, the second switch 133 is closed, the first switch 132 is opened, and the DC-DC converter 130 is deactivated, and that after detecting that the speed of rotation of the compressor has exceeded an end-of-starting threshold, the starting accessories 168 are deactivated and the second switch 133 is opened.

The method and the system of the invention for reliable starting present numerous advantages.

They make it possible to reduce the number of abortive starts as a result of failure to ignite or of flameout in the combustion chamber of the gas generator of the turbine engine.

They make it possible for starting to be more robust relative to starting conditions (flying conditions, oil temperature, power supply voltage for the starter, etc. . . . ).

They make it possible to minimize dispersions on the duration of starts.

They therefore make it possible to avoid ventilation between an abortive start and a new attempt, and consequently they make it possible to reduce the size and the weight of the on-board battery.

They simplify the work of the manufacturer in designing the electrical power supply for the starter, in order to comply with the required maximum starting torque template.

They make it possible to limit inrush current when starting at zero speed, thereby making it possible to minimize wear on the brushes of the starter-generator, to minimize stresses on the coupling (fluting, weak link), to reduce the voltage drop in the on-board network, and to optimize dimensioning of the battery.

This leads to better availability for helicopters, given the lower rate of abortive starts.

By reducing the power of the device, its weight and cost are also reduced compared with a static converter dimensioned for full starting power (about 15% of the maximum starting power).

The system of the invention is compatible with most 28 V starter-generators and starters with brushes presently in use on helicopters.

The invention is not limited to the embodiments described, but extends to any variant coming within the ambit of the claims.

Thus, by way of example, the device including the controlled DC-DC converter 130 may be installed by a manufacturer directly in the electrical master box 141, provided the specifications of the engine are known, which specifications comprise firstly requirements in terms of performance (torque, speed), and secondly the interfaces used (format for transmitting the speed setpoint to the device).

The invention claimed is:

1. A starting system for reliably starting a turbine engine comprising a storage battery, a DC starter, an electronic regulation computer, a transmission gearbox, starting accessories for managing the distribution of fuel to injectors and for igniting the fuel during a starting stage, a gas generator comprising a compressor, a combustion chamber, a high pressure turbine, and a free turbine, the system comprising:
   a first circuit and a second circuit connected in parallel between said storage battery and said DC starter, wherein the first circuit comprises a DC-DC converter connected in series with a first switch, and the second circuit comprises a second switch;
   at least one sensor configured to sense a speed of rotation of the compressor;
   a sensor configured to sense a temperature at an inlet to the free turbine; and
   a control circuit configured to control the first and second switches as a function of information supplied by the at least one sensor configured to sense the speed of rotation of the compressor and by the sensor configured to sense the inlet temperature of the free turbine.

2. The starting system according to claim 1, further comprising a diode connected in the first circuit in series with the DC-DC converter and the first switch.

3. The starting system according to claim 1, wherein the DC starter is a starter-generator.

4. The starting system according to claim 1, further comprising a sensor configured to sense a speed of rotation of the DC starter, wherein the DC-DC converter is configured to be servo-controlled by the sensor configured to sense the speed of rotation of the DC starter when said first switch is closed.

5. The starting system according to claim 4, wherein the electronic regulation computer is configured to prepare a speed setpoint Nref corresponding to a preferred ignition window of the turbine engine and is configured to transmit the speed setpoint Nref to the DC-DC converter.

6. The starting system according to claim 1, wherein the DC-DC converter is configured to be servo-controlled by the sensor configured to sense the speed of rotation of the compressor when said first switch is closed.

7. The starting system according to claim 6, wherein the electronic regulation computer is configured to prepare a speed setpoint Nref corresponding to a preferred ignition window of the turbine engine, is configured to prepare a torque setpoint Cref, and is configured to transmit the torque setpoint Cref to the DC-DC converter.

8. The starting system according to claim 1, wherein the DC-DC converter includes an electromagnetic compatibility filter, a pre-load circuit, and a buck type chopper.

9. The starting system according to claim 1, wherein the electronic regulation computer is configured to prepare respective logic signals SL1, SL2 that are applied for actuating the first and second switches.

10. The starting system according to claim 1, wherein the electronic regulation computer is configured to detect that the speed of rotation NG of the compressor has exceeded a predetermined threshold and is configured to deactivate the first and second switches and the starting accessories.

11. The starting system according to claim 1, further comprising a control circuit for the DC-DC converter, the control circuit for the DC-DC converter comprising both a speed servo-control loop and a current servo-control loop.

12. The starting system according to claim 11, wherein said speed servo-control loop and said current servo-control loop are incorporated in an independent controller circuit configured to control the DC-DC converter.

13. The starting system according to claim 11, wherein said speed servo-control loop is incorporated in said electronic regulation computer and said current servo-control loop is incorporated in an independent controller circuit configured to control the DC-DC converter.

14. The starting system according to claim 1, wherein said system is applied to an aircraft turbine engine.

15. A starting method for reliably starting a turbine engine comprising a storage battery, a DC starter, an electronic regulation computer, a transmission gearbox, starting accessories for managing the distribution of fuel to injectors and for igniting the fuel during a starting stage, a gas generator comprising a compressor, a combustion chamber, a high pressure turbine, and a free turbine, the starting method comprising:

connecting a first circuit and a second circuit in parallel and interposing said first and second circuits between said storage battery and said DC starter, the first circuit comprising a DC-DC converter connected in series with a first switch, and the second circuit comprising a second switch;

measuring a speed of rotation of the compressor;

measuring a temperature at an inlet of the free turbine; and controlling said first and second switches as a function of measurement information concerning the speed of rotation of the compressor and the temperature at the inlet of the free turbine.

16. The starting method according to claim 15, wherein when initializing the starting, the starting accessories are activated and simultaneously a speed setpoint Nref is transmitted to said DC-DC converter, the speed setpoint corresponding to a preferred ignition window of the turbine, and said first switch is closed while activating the DC-DC converter to accelerate the compressor and then to regulate the voltage delivered to the starter so as to regulate the acquisition of speed by said compressor to the speed setpoint Nref, and wherein when said speed setpoint Nref is reached, the combustion chamber of the turbine engine is ignited, the temperature at the inlet of the free turbine is measured, and once a rise in temperature is detected confirming that the combustion chamber has ignited, the second switch is closed, the first switch is opened, and the DC-DC converter is deactivated, and after detecting that the speed of rotation of the compressor has exceeded an end-of-starting threshold, the starting accessories are deactivated and the second switch is opened.

* * * * *